United States Patent
Nakao et al.

(10) Patent No.: US 11,637,451 B2
(45) Date of Patent: Apr. 25, 2023

(54) NON-CONTACT POWER FEEDING DEVICE INCLUDING POWER TRANSMITTER DEVICE WITH PHASE CONTROL CIRCUIT

(71) Applicant: OMRON Corporation, Kyoto (JP)

(72) Inventors: Goro Nakao, Inazawa (JP); Kenichi Tabata, Ichinomiya (JP); Yusuke Kawai, Ichinomiya (JP); Atsushi Nomura, Ichinomiya (JP); Takahiro Takeyama, Ichinomiya (JP); Masanobu Nakajo, Nagoya (JP)

(73) Assignee: OMRON Corporation, Kyoto (JP)

( * ) Notice: Subject to any disclaimer, the term of this patent is extended or adjusted under 35 U.S.C. 154(b) by 44 days.

(21) Appl. No.: 17/294,790

(22) PCT Filed: Oct. 16, 2019

(86) PCT No.: PCT/JP2019/040755
§ 371 (c)(1),
(2) Date: May 18, 2021

(87) PCT Pub. No.: WO2020/116033
PCT Pub. Date: Jun. 11, 2020

(65) Prior Publication Data
US 2021/0408828 A1 Dec. 30, 2021

(30) Foreign Application Priority Data
Dec. 3, 2018 (JP) .............................. JP2018-226354

(51) Int. Cl.
*H02J 50/12* (2016.01)
*H02J 50/60* (2016.01)

(52) U.S. Cl.
CPC .............. *H02J 50/12* (2016.02); *H02J 50/60* (2016.02)

(58) Field of Classification Search
CPC ............. H02J 50/10; H02J 50/12; H02J 50/60
See application file for complete search history.

(56) References Cited

U.S. PATENT DOCUMENTS

2014/0159500 A1* 6/2014 Sankar ................... H02J 50/10
307/104
2014/0285027 A1* 9/2014 Sakamoto ............... B60L 53/30
307/104

(Continued)

FOREIGN PATENT DOCUMENTS

WO 2013/118274 A1 8/2013
WO 2015/173850 A1 11/2015

OTHER PUBLICATIONS

English translation of the International Search Report ("ISR") of PCT/JP2019/040755 dated Dec. 3, 2019.
Written Opinion("WO") of PCT/JP2019/040755 dated Dec. 3, 2019.

*Primary Examiner* — Rexford N Barnie
*Assistant Examiner* — Joseph N Inge
(74) *Attorney, Agent, or Firm* — Metrolex IP Law Group, PLLC

(57) ABSTRACT

A power transmitter device of a non-contact power feeding device includes a transmitter coil configured to supply power to the power receiver device, a power supply circuit including a plurality of switching elements connected between a DC power supply and the transmitter coil in a full-bridge configuration or a half-bridge configuration. The power supply circuit may be configured to switch the plurality of switching elements to an on or off state at a switching frequency to convert DC power supplied from the DC power supply into AC power having the switching frequency and supply the AC power to the transmitter coil, and a phase control circuit including at least one LC series circuit connected to both ends of the transmitter coil.

16 Claims, 8 Drawing Sheets

(56) References Cited

U.S. PATENT DOCUMENTS

| | | |
|---|---|---|
| 2015/0001958 A1 | 1/2015 | Abe et al. |
| 2015/0194811 A1* | 7/2015 | Mao ................ H02M 3/33523 |
| | | 307/104 |
| 2017/0149285 A1 | 5/2017 | Ushijima et al. |
| 2018/0269726 A1 | 9/2018 | Abdolkhani |
| 2019/0027964 A1* | 1/2019 | Yabumoto ............... H02J 50/70 |
| 2019/0214853 A1 | 7/2019 | Ushijima et al. |
| 2020/0127496 A1 | 4/2020 | Ushijima et al. |

* cited by examiner

NON-CONTACT POWER FEEDING DEVICE INCLUDING POWER TRANSMITTER DEVICE WITH PHASE CONTROL CIRCUIT

TECHNICAL FIELD

The present invention relates to a non-contact power feeding device.

BACKGROUND ART

Research has been conducted on a so-called non-contact power feeding (also called wireless power transfer) technology of transmitting power across space without using metal contacts or the like.

Proposed as one of such non-contact power feeding technologies is a technology for detecting phase information on a resonance current flowing through a resonance circuit provided only in a secondary (power receiver) coil, determining a drive frequency based on the phase information, and driving a primary (power transmitter) coil such that a current phase of a drive current flowing through the primary coil is slightly delayed from a voltage phase (see, for example, Patent Document 1). Further, in this technology, a Q factor determined based on leakage inductance of the secondary coil, capacitance of a resonance capacitor, and equivalent load resistance is set equal to or greater than a value obtained by $Q=2/k^2$ (k is a coupling coefficient). According to this technology, heat generation in the primary coil is suppressed, and a frequency that makes a power factor the most suitable as viewed from the primary coil can be automatically selected as the drive frequency.

Patent Document 1: WO 2015/173850 A

SUMMARY

In the above-described technology, however, resonance occurs exclusively in the resonance circuit of the power receiver, so that magnetic flux is concentrated near the power receiver coil. Therefore, even when a small metal piece is present near the power receiver coil, abnormal heat generation may occur, and as a result, a fire may occur. Further, in order to increase the Q factor as described above, the power receiver coil needs to be larger in size.

A non-contact power feeding device according to one or more embodiments may be capable of suppressing the occurrence of an abnormality even when foreign matter is present between a transmitter coil of a power transmitter-side device and a receiver coil of a power receiver-side device.

A non-contact power feeding device according to one or more embodiments may include a power transmitter device and a power receiver device to which the power transmitter device transmits power in a non-contact manner. In the non-contact power feeding device, the power transmitter device includes a transmitter coil configured to supply power to the power receiver device, a power supply circuit including a plurality of switching elements connected between a DC power supply and the transmitter coil in a full-bridge configuration or a half-bridge configuration, the power supply circuit being configured to switch the plurality of switching elements to an on or off state at a switching frequency to convert DC power supplied from the DC power supply into AC power having the switching frequency and supply the AC power to the transmitter coil, and a phase control circuit including at least one LC series circuit connected to both ends of the transmitter coil. Such a structure may allow a non-contact power feeding device to suppress the occurrence of an abnormality even when foreign matter is present between the transmitter coil of the power transmitter device and the receiver coil of the power receiver device.

In a non-contact power feeding device according to one or more embodiments, each of the at least one LC series circuit of the phase control circuit of the power transmitter device may include a coil, a first capacitor and a second capacitor connected in series with the coil and connected in parallel with each other, and a switching element connected in series with the second capacitor, the switching element being configured to connect the second capacitor to the coil in response to being switched to the on state and to separate the second capacitor from the coil in response to being switched to the off state. A power transmitter device in accordance with one or more embodiments may further include a current detection circuit configured to obtain a measured value of an amount of current flowing through any of the plurality of switching elements of the power supply circuit, and a control circuit configured to switch the switching element of each of the at least one LC series circuit to the on or off state to bring the measured value of the amount of current within a predetermined allowable range in response to any of the plurality of switching elements of the power supply circuit being turned off. Such a structure may allow a non-contact power feeding device to adjust the amount of phase delay of the current flowing through each switching element of the power supply circuit relative to the phase of the voltage applied to the switching element of the power supply circuit so as to reduce the switching loss and conduction loss of the switching element of the power supply circuit.

Alternatively, in a non-contact power feeding device in accordance with one or more embodiments, each of the at least one LC series circuit of the phase control circuit of the power transmitter device may include a coil, a first capacitor and a second capacitor connected in series with the coil and connected in parallel with each other, and a switching element connected in series with the second capacitor, the switching element being configured to connect the second capacitor to the coil in response to being switched to the on state and to separate the second capacitor from the coil in response to being switched to the off state. A power transmitter device in accordance with one or more embodiments may further include a control circuit configured to control the switching frequency at which the plurality of switching elements of the power supply circuit are switched to the on or off state and to switch the switching element of each of the at least one LC series circuit to the on or off state in accordance with the switching frequency of the AC power supplied from the power supply circuit to the transmitter coil while the non-contact power feeding device is in constant voltage output action. Such a structure may allow a non-contact power feeding device to adjust, even when the switching frequency of the AC power supplied from the power supply circuit to the transmitter coil fluctuates, the amount of phase delay of the current flowing through each switching element of the power supply circuit relative to the phase of the voltage applied to the switching element of the power supply circuit so as to reduce the switching loss of the switching element of the power supply circuit.

A control circuit of the power transmitter device in accordance with one or more embodiments may switch the switching element of each of the at least one LC series circuit to the on or off state to make a resonance frequency of each of the at least one LC series circuit higher than the switching frequency of the AC power supplied from the power supply circuit to the transmitter coil. Such a structure may allow a non-contact power feeding device to reduce the switching loss of each switching element of the power supply circuit in accordance with the switching frequency of the AC power supplied from the power supply circuit to the transmitter coil.

Alternatively, in a non-contact power feeding device, each of the at least one LC series circuit of the phase control circuit of the power transmitter device may include a switching element configured to connect the LC series circuit to the transmitter coil in response to being switched to the on state and to separate the LC series circuit from the transmitter coil in response to being switched to the off state. A power transmitter device in accordance with one or more embodiments may further include a control circuit configured to control the switching frequency at which the plurality of switching elements of the power supply circuit are switched to the on or off state and to switch the switching element of each of the at least one LC series circuit to the on or off state in accordance with the switching frequency or voltage of the AC power supplied from the power supply circuit to the transmitter coil while the non-contact power feeding device is in the constant voltage output action. Such a structure may allow a non-contact power feeding device to reduce the switching loss of each switching element of the power supply circuit even when the degree of coupling between the transmitter coil and the receiver coil decreases.

A power receiver device in one or more embodiments may include a resonance circuit including a receiver coil configured to receive power via the transmitter coil of the power transmitter device, and a resonance capacitor configured to resonate with the receiver coil, a rectifying circuit configured to rectify power output from the resonance circuit, a voltage detection circuit configured to measure an output voltage of power output from the rectifying circuit to obtain a measured value of the output voltage, a determination circuit configured to determine whether the non-contact power feeding device is in the constant voltage output action based on the measured value of the output voltage, and a first transceiver configured to transmit, to the power transmitter device, a signal containing determination information representing whether the non-contact power feeding device is in the constant voltage output action. A power transmitter device in one or more embodiments may further include a second transceiver configured to receive the signal containing the determination information, and the control circuit control, when the determination information represents that the non-contact power feeding device is not in the constant voltage output action, the switching frequency to prevent the measured value of the output voltage from changing even when resistance of a load circuit connected to the rectifying circuit of the power receiver device changes. Such a structure may allow a non-contact power feeding device to continue the constant voltage output action even when the degree of coupling between the transmitter coil and the receiver coil changes, and to switch the phase control circuit to the on or off state in accordance with the switching frequency for the constant voltage output action, so that even when the degree of coupling between the transmitter coil and the receiver coil changes, the switching loss of each switching element of the power supply circuit can be reduced.

In a non-contact power feeding device in accordance with one or more embodiments, at least one LC series circuit may have a first end connected to a first end of the transmitter coil and may have a second end connected to a second end of the transmitter coil. Such a structure may allow only one LC series circuit to be provided in the phase control circuit, so that the power transmitter device is downsized.

Alternatively, in a non-contact power feeding device in accordance with one or more embodiments, at least one LC series circuit may comprise a first LC series circuit having a first end connected to a first end of the transmitter coil and having a second end grounded, and a second LC series circuit having a first end connected to a second end of the transmitter coil and having a second end grounded. Such a structure may simplify the switching of each LC series circuit to the on or off state or may simplify the control of the resonance frequency of each LC series circuit.

DETAILED DESCRIPTION

Hereinafter, a non-contact power feeding device according to one or more embodiments is described with reference to the drawings. In the non-contact power feeding device according to one or more embodiments, an LC series circuit is connected between each end of a power transmitter coil (hereinafter, referred to as a transmitter coil) of a power transmitter-side device (hereinafter, simply referred to as a power transmitter device) and the ground. The above described configuration allows the non-contact power feeding device to control the amount of phase delay of a current flowing through each switching element of a power supply circuit that supplies AC power to the transmitter coil relative to a phase of a voltage applied to the switching element of the power supply circuit to reduce switching loss of the power supply circuit without increasing a Q factor of a resonance circuit of a power receiver-side device (hereinafter, simply referred to as a power receiver device). The above described configuration may further allow a reduction in the number of turns of a coil (hereinafter, referred to as a receiver coil) included in the resonance circuit of the power receiver device. Therefore, even when power is transmitted by resonance of the resonance circuit of the power receiver device that mainly resonates with the AC power supplied to the transmitter coil, the non-contact power feeding device in accordance with one or more embodiments, may reduce deflection of magnetic flux between the transmitter coil and the receiver coil to prevent the occurrence of an abnormality such as abnormal heat generation even when foreign matter is present between the transmitter coil and the receiver coil. Furthermore, the non-contact power feeding device may be capable of outputting a constant voltage by controlling a switching frequency of the AC power supplied from the power supply circuit to the transmitter coil, and controls, during the constant voltage output action, a voltage of the AC power supplied from the power supply circuit to the transmitter coil to bring an output voltage from the resonance circuit of the power receiver device within a predetermined allowable range. Note that the constant voltage output action corresponds to an action in which the output voltage from the resonance circuit is made approximately constant even when resistance of a load circuit connected to the power receiver device changes.

Further, as shown in the following embodiment, a structure where a capacitor is connected in series with the transmitter coil between the transmitter coil and the LC series circuit has no effect on the control of the amount of phase delay by the LC series circuit. Therefore, a structure where the LC series circuit is connected to one end of the transmitter coil also includes a structure where the LC series circuit is connected to one end of the transmitter coil via a capacitor.

Figure 1:
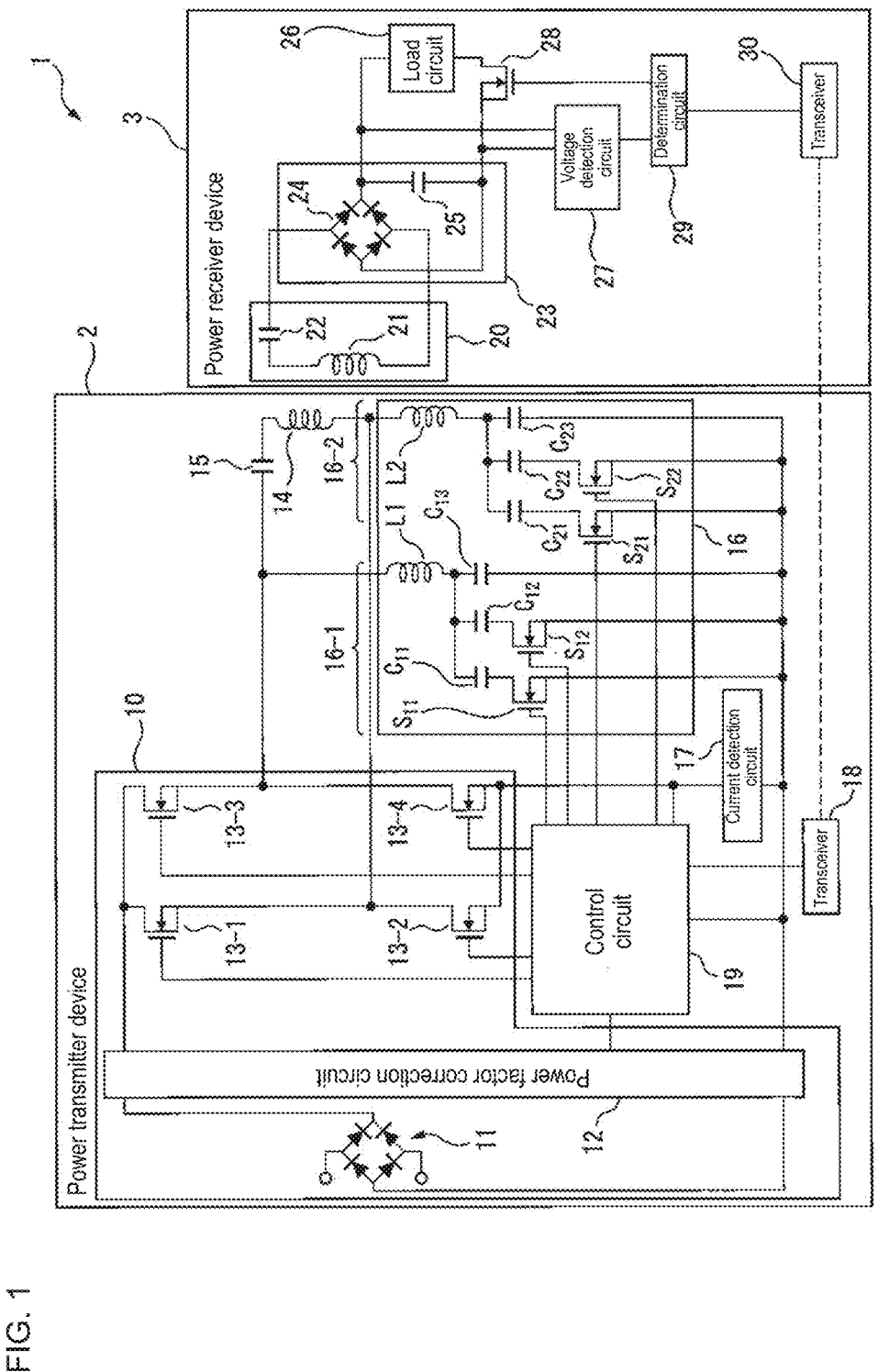
FIG. 1 is a schematic structure diagram illustrating a non-contact power feeding device according to one or more embodiments.

FIG. 1 is a schematic structure diagram of the non-contact power feeding device according to one or more embodiments. As shown in FIG. 1, the non-contact power feeding device 1 includes a power transmitter device 2 and a power receiver device 3 to which the power transmitter device 2 transmits power across space in a non-contact manner. The power transmitter device 2 includes a power supply circuit 10, a transmitter coil 14, a capacitor 15, a phase control circuit 16, a current detection circuit 17, a transceiver 18, and a control circuit 19. On the other hand, the power receiver device 3 includes a resonance circuit 20 including a receiver coil 21 and a resonance capacitor 22, a rectifying and smoothing circuit 23, a load circuit 26, a voltage detection circuit 27, a switching element 28, a determination circuit 29, and a transceiver 30.

First, a description will be given of the power transmitter device 2.

The power supply circuit 10 supplies the transmitter coil 14 with AC power having an adjustable switching frequency and an adjustable voltage. Therefore, the power supply circuit 10 includes a power supply 11, a power factor correction circuit 12, and four switching elements 13-1 to 13-4.

The power supply 11 supplies power having a predetermined pulsating voltage. Therefore, the power supply 11 is connected to a commercial AC power supply and includes a full-wave rectifying circuit for rectifying AC power supplied from the AC power supply.

The power factor correction circuit 12 converts a voltage of the power output from the power supply 11 into DC power having a voltage suitable for control of the control circuit 19 and outputs the DC power. This allows the power factor correction circuit 12 to have a structure similar to the structure of any of the various power factor correction circuits capable of adjusting the output voltage under control of the control circuit 19, such as the structure of the power factor correction circuit of the power transmitter device disclosed in Japanese Patent No. 6390808. Note that the power supply 11 and the power factor correction circuit 12 make up a DC power supply.

The four switching elements 13-1 to 13-4 may be, for example, n-channel MOSFETs. According to the embodiment, the four switching elements 13-1 to 13-4 make up a full-bridge circuit connected between the power supply 11 and the power factor correction circuit 12, and the transmitter coil 14 in a full-bridge configuration. That is, among the four switching elements 13-1 to 13-4, the switching element 13-1 and the switching element 13-2 are connected in series between a positive electrode terminal and negative electrode terminal of the power supply 11 via the power factor correction circuit 12. Further, according to the embodiment, the switching element 13-1 is connected to the positive electrode of the power supply 11, and the switching element 13-2 is connected to the negative electrode of the power supply 11. The switching element 13-1 has a drain terminal connected to the positive electrode terminal of the power supply 11 via the power factor correction circuit 12 and has a source terminal of the switching element 13-1 connected to a drain terminal of the switching element 13-2. Further, the switching element 13-2 has a source terminal connected to the negative electrode terminal of the power supply 11 via the power factor correction circuit 12. Furthermore, the source terminal of the switching element 13-1 and the drain terminal of the switching element 13-2 are connected to one end of the transmitter coil 14 via the capacitor 15, and the source terminal of the switching element 13-2 is connected to the other end of the transmitter coil 14 via the switching element 13-4.

Similarly, among the four switching elements 13-1 to 13-4, the switching element 13-3 and the switching element 13-4 are connected in parallel with the switching element 13-1 and the switching element 13-2 and in series between the positive electrode terminal and negative electrode terminal of the power supply 11 via the power factor correction circuit 12. Further, the switching element 13-3 is connected to the positive electrode of the power supply 11, and the switching element 13-4 is connected to the negative electrode of the power supply 11. The switching element 13-3 has a drain terminal connected to the positive electrode terminal of the power supply 11 via the power factor correction circuit 12 and has a source terminal connected to a drain terminal of the switching element 13-4. Further, the switching element 13-4 has a source terminal connected to the negative electrode terminal of the power supply 11 via the power factor correction circuit 12. Furthermore, the source terminal of the switching element 13-3 and the drain terminal of the switching element 13-4 are connected to the other end of the transmitter coil 14.

Further, the switching elements 13-1 to 13-4 have their respective gate terminals connected to the control circuit 19. Furthermore, the switching elements 13-1 to 13-4 may have their respective gate terminals connected, via resistors, to their respective source terminals so as to ensure that each switching element is brought into the on state when a voltage that brings the switching element into the on state is applied. Then, the switching elements 13-1 to 13-4 are each switched to the on or off state at an adjustable switching frequency in accordance with a control signal from the control circuit 19. According to the embodiment, a pair of the switching element 13-1 and the switching element 13-4 and a pair of the switching element 13-2 and the switching element 13-3 are alternately switched to the on or off state such that while the switching element 13-1 and the switching element 13-4 are in the on state, the switching element 13-2 and the switching element 13-3 are in the off state, whereas while the switching element 13-2 and the switching element 13-3 are in the on state, the switching element 13-1 and the switching element 13-4 are in the off state. This causes DC power supplied from the power supply 11 via the power factor correction circuit 12 to be converted into AC power having a switching frequency of each of the switching elements and supplied to the transmitter coil 14.

Then, the transmitter coil 14 transmits the AC power supplied from the power supply circuit 10 to the resonance circuit 20 of the power receiver device 3 across space.

The capacitor 15 is connected in series with the transmitter coil 14 and cuts off a direct current flowing through the transmitter coil 14. According to the embodiment, the capacitor 15 is connected between the one end of the transmitter coil 14, and the source terminal of the switching element 13-3 and the drain terminal of the switching element 13-4. Note that it may be preferable that capacitance of the capacitor 15 be designed to make the resonance frequency of the resonance circuit made up of the transmitter coil 14 and the capacitor 15 different from a frequency that falls within an adjustment range of the switching frequency of the AC power supplied from the power supply circuit 10 to the transmitter coil 14, that is, to prevent the resonance circuit made up of the transmitter coil 14 and the capacitor 15 from resonating with the AC power supplied from the power supply circuit 10 to the transmitter coil 14. Further, the capacitor 15 need not be provided.

The phase control circuit 16 includes, across the transmitter coil 14, two LC series circuits 16-1, 16-2 each having one end connected to the transmitter coil 14 (or the capacitor 15) and having the other end connected to the negative electrode terminal of the power supply 11, that is, grounded. The LC series circuits 16-1, 16-2 each include coils L1, L2, n (n is an integer equal to or greater than 2, and n is equal to 3 in FIG. 1) capacitors C1$k$, C2$k$ ($k$=1 to n) connected in series with the coils L1, L2 and in parallel with each other, and switching elements S1$j$, S2$j$ ($j$=1 to n−1) such as MOSFETs each connected in series with a corresponding one of the (n−1) capacitors among the n capacitors C1$k$, C2$k$. The switching elements S1$j$, S2$j$ are switched to the on or off state under the control of the control circuit 19. Then, the larger the number of switching elements switched to the on state among the switching elements S1$j$, S2$j$, the larger the capacitance of the LC series circuits 16-1, 16-2, leading to a reduction in the resonance frequency of the LC series circuits 16-1, 16-2. This causes the amount of phase delay of the current flowing through the switching elements 13-1 to 13-4 of the power supply circuit 10 relative to the phase of the voltage applied to the switching elements 13-1 to 13-4 to be controlled in accordance with the number of switching elements switched to the on state among the switching elements S1$j$, S2$j$. Therefore, even when the degree of coupling between the transmitter coil 14 and the receiver coil 21 changes, and the switching frequency and voltage of the AC power supplied to the transmitter coil 14 change accordingly, the power transmitter device 2 can continue soft switching action by the power supply circuit 10 and the transmitter coil 14 and reduce the switching loss of the switching elements 13-1 to 13-4 of the power supply circuit 10. Since the one end of each of the LC series circuits is grounded, a reference voltage for the switching elements of each of the LC series circuits becomes constant, thereby simplifying the control on each of the LC series circuits.

Further, in the LC series circuits 16-1, 16-2, the larger the inductance of the coils L1, L2, the more preferable it is. This is because the larger the inductance of the coils L1, L2, the smaller the current flowing through the LC series circuits 16-1, 16-2. For example, it is preferable that the inductance of the coils L1, L2 be greater than a value that results from multiplying a maximum value kmax of an assumed degree of coupling by self-inductance L1 on the transmitter side when the transmitter coil 14 and the receiver coil 21 are electromagnetically coupled so as to make the current flowing through the LC series circuits 16-1, 16-2 smaller than an excitation current component, of the current flowing through the transmitter coil 14, independent of a load of the load circuit 26 connected to the resonance circuit 20.

The current detection circuit 17 measures the amount of current flowing through the switching elements 13-1 to 13-4 of the power supply circuit 10. The current detection circuit 17 may be, for example, any of various known current detection circuits capable of measuring a direct current. According to the embodiment, the current detection circuit 17 is connected between the source terminal of the switching element 13-2 and the source terminal of the switching element 13-4, and the negative electrode terminal of the power supply 11. The current detection circuit 17 measures the amount of current flowing through the switching elements 13-1 to 13-4 while the non-contact power feeding device 1 is in power transmission action, and outputs, to the control circuit 19, a signal representing the amount of current thus measured.

Each time the transceiver 18 receives a radio signal from the transceiver 30 of the power receiver device 3, the transceiver 18 extracts determination information representing whether the non-contact power feeding device 1 is in the constant voltage output action from the radio signal and outputs the determination information to control circuit 19. Therefore, the transceiver 18 includes, for example, an antenna that receives the radio signal in accordance with a predetermined radio communication standard, and a transceiver circuit that demodulates the radio signal. Note that the predetermined radio communication standard may be, for example, ISO/IEC 15693, ZigBee (registered trademark), or Bluetooth (registered trademark).

The control circuit 19 includes, for example, a non-volatile memory circuit and a volatile memory circuit, an operation circuit, an interface circuit for use in connection to another circuit, and a drive circuit for use in outputting the control signal to each switching element. Each time the control circuit 19 receives the determination information from the transceiver 18, the control circuit 19 controls the switching frequency and voltage of the AC power supplied from the power supply circuit 10 to the transmitter coil 14 in accordance with the determination information.

Therefore, according to the embodiment, the control circuit 19 controls each of the switching elements 13-1 to 13-4 such that the pair of the switching element 13-1 and the switching element 13-4 and the pair of the switching element 13-2 and the switching element 13-3 are alternately brought into the on state, and a period in which the pair of the switching element 13-1 and the switching element 13-4 are in the on state is equal to a period in which the pair of switching element 13-2 and the switching element 13-3 are in the on state within one cycle of the switching frequency. Note that the control circuit 19 may have a dead time during which both the pair of the switching element 13-1 and the switching element 13-4 and the pair of the switching element 13-2 and the switching element 13-3 are in the off state when the pair of the switching element 13-1 and the switching element 13-4 and the pair of the switching element 13-2 and the switching element 13-3 are switched to the on or off state so as to prevent the power supply 11 from being short-circuited due to both the pair of the switching element 13-1 and the switching element 13-4 and the pair of the switching element 13-2 and the switching element 13-3 having been brought into the on state at the same time.

Further, the control circuit 19 controls, in accordance with the switching frequency, the power factor correction circuit 12 so as to cause the power supply circuit 10 to output the AC power having a voltage required for the constant voltage output action of the non-contact power feeding device 1. For example, the control circuit 19 only needs to perform the same control as the control on the power factor correction circuit of the power transmitter device disclosed in Japanese Patent No. 6390808.

Further, the control circuit 19 controls the resonance frequency of the LC series circuits 16-1, 16-2 of the phase control circuit 16 in accordance with the amount of current detected by the current detection circuit 17.

Note that the details of the control on the resonance frequency of the LC series circuits 16-1, 16-2 of the phase control circuit 16 and the control on the switching frequency and the voltage applied to the transmitter coil 14 performed by the control circuit 19 will be described later.

Next, a description will be given of the power receiver device 3.

The resonance circuit 20 is an LC resonance circuit including the receiver coil 21 and the resonance capacitor 22 connected in series with each other. The receiver coil 21 of the resonance circuit 20 has one end connected to one input terminal of the rectifying and smoothing circuit 23 via the resonance capacitor 22. Further, the receiver coil 21 has the other end connected to the other input terminal of the rectifying and smoothing circuit 23.

The receiver coil 21 receives power from the transmitter coil 14 by resonating with the alternating current flowing through the transmitter coil 14 of the power transmitter device 2. Then, the receiver coil 21 outputs the power thus received to the rectifying and smoothing circuit 23 via the resonance capacitor 22. Note that the receiver coil 21 and the transmitter coil 14 of the power transmitter device 2 may be the same or different in the number of turns.

The resonance capacitor 22 has one end connected to the one end of the receiver coil 21 and has the other end connected to the rectifying and smoothing circuit 23. Then, the resonance capacitor 22 receives power by resonating, together with the receiver coil 21, with the current flowing through the transmitter coil 14 and outputs the power thus received to the rectifying and smoothing circuit 23.

The rectifying and smoothing circuit 23 is an example of a rectifying circuit and includes a full-wave rectifying circuit 24 including four bridge-connected diodes and a smoothing capacitor 25. The rectifying and smoothing circuit 23 rectifies and smooths the power output from the resonance circuit 20 to convert the power into DC power. Then, the rectifying and smoothing circuit 23 outputs the DC power to the load circuit 26.

The voltage detection circuit 27 measures the output voltage across both terminals of the rectifying and smoothing circuit 23. The output voltage across both the terminals of the rectifying and smoothing circuit 23 corresponds to the output voltage of the resonance circuit 20 on a one-to-one basis; therefore, a measured value of the output voltage across both the terminals of the rectifying and smoothing circuit 23 indirectly represents a measured value of the output voltage of the resonance circuit 20. The voltage detection circuit 27 may be, for example, any of various known voltage detection circuits capable of detecting a DC voltage. Then, the voltage detection circuit 27 outputs a voltage detection signal representing the measured value of the output voltage to the determination circuit 29.

The switching element 28 is, for example, a MOSFET and is connected between the rectifying and smoothing circuit 23 and the load circuit 26. The switching element 28 is brought into the off state to interrupt a current flowing from the rectifying and smoothing circuit 23 to the load circuit 26 (that is, to make alternating current equivalent resistance Rac of the load circuit 26 infinite), whereas the switching element 28 is brought into the on state to allow a current to flow from the rectifying and smoothing circuit 23 to the load circuit 26.

The determination circuit 29 determines whether the non-contact power feeding device 1 is in the constant voltage output action based on the measured value of the output voltage received from the voltage detection circuit 27 and whether the measured value of the output voltage falls within an allowable voltage range applied while the non-contact power feeding device 1 is in the constant voltage output action. Then, the determination circuit 29 notifies the transceiver 30 of the determination result. Therefore, the determination circuit 29 includes, for example, a memory circuit that stores the allowable voltage range, an operation circuit that compares the measured value of the output voltage with the allowable voltage range, and a control circuit that switches the switching element 28 to the on or off state.

Further, the determination circuit 29 switches the switching element 28 to the on or off state in a predetermined period while the measured value of the output voltage is out of the allowable voltage range. This causes resistance of the entire circuit including the load circuit 26 connected to the rectifying and smoothing circuit 23 to change in the predetermined period. This in turn allows the determination circuit 29 to determine whether the measured value of the output voltage is approximately constant while switching the switching element 28 to the on or off state to determine whether the non-contact power feeding device 1 is in the constant voltage output action. Therefore, while the measured value of the output voltage is approximately constant even when the switching element 28 is switched to the on or off state in the predetermined period, the determination circuit 29 notifies the transceiver 30 that the non-contact power feeding device 1 is in the constant voltage output action.

Further, the determination circuit 29 stops switching the switching element 28 to the on or off state when the measured value of the output voltage indicates that the non-contact power feeding device 1 is in the constant voltage output action for a fixed period longer than the predetermined period to maintain the switching element 28 in the on state. Then, the determination circuit 29 determines whether the measured value of the output voltage is within the allowable voltage range and notifies the transceiver 30 of the determination result.

At this time, the determination circuit 29 notifies, when the measured value of the output voltage is within the allowable voltage range for the fixed period longer than the predetermined period, the transceiver 30 of the determination result representing that the non-contact power feeding device 1 is in the constant voltage output action and the measured value of the output voltage is within the allowable voltage range.

Note that, according to a modification, the power receiver device 3 may include a resistor connected, in parallel with the load circuit 26, to the rectifying and smoothing circuit 23. In this case, the switching element 28 may be provided in series with the resistor and in parallel with the load circuit 26. In this case, the determination circuit 29 maintains the switching element 28 in the off state while the measured value of the output voltage is within the allowable voltage range. On the other hand, when the measured value of the output voltage falls out of the allowable voltage range, the determination circuit 29 only needs to switch the switching element 28 to the on or off state in the predetermined period, as in the above-described embodiment. According to this modification, the power keeps being supplied to the load circuit 26 even while the non-contact power feeding device 1 is out of the constant voltage output action.

According to another modification, a second switching element such as a MOSFET may be provided in parallel with the above-described resistor and in series with the load circuit 26. In this case, while the measured value of the output voltage is within the allowable voltage range, the determination circuit 29 brings the second switching element into the on state to enable the power supply to the load circuit 26. On the other hand, when the measured value of the output voltage falls out of the allowable voltage range, the determination circuit 29 may bring the second switching element into the off state to interrupt the power supply to the load circuit 26. This prevents, even when the voltage of the received power becomes excessively high while the switching frequency is under adjustment by the power transmitter device 2, the excessively high voltage from being applied to the load circuit 26.

Further, the transceiver 30 generates, in accordance with the determination result received from the determination circuit 29, a radio signal containing the determination information representing whether the non-contact power feeding device 1 is in the constant voltage output action and whether the measured value of the output voltage is within the allowable voltage range at predetermined transmission intervals and transmits the radio signal to the transceiver 18 of the power transmitter device 2. Therefore, the transceiver 30 includes, for example, a transceiver circuit that generates a radio signal in accordance with a predetermined radio communication standard, and an antenna that outputs the radio signal. Note that the predetermined radio communication standard may be, for example, ISO/IEC 15693, ZigBee (registered trademark), or Bluetooth (registered trademark), as in the transceiver 18.

A description will be given below of the details of the operation of the non-contact power feeding device 1.

According to the embodiment, the control circuit 19 of the power transmitter device 2 controls, based on the determination information received from the transceiver 18, the switching frequency and voltage of the AC power supplied from the power supply circuit 10 to the transmitter coil 14 so as to cause the non-contact power feeding device 1 to continue the constant voltage output action. Further, the control circuit 19 switches the switching elements S1*j*, S2*j* of the LC series circuits 16-1, 16-2 of the phase control circuit 16 to the on or off state based on the amount of current detected by the current detection circuit 17 to control the amount of phase delay of the current flowing through the switching elements 13-1 to 13-4 of the power supply circuit 10 relative to the phase of the voltage applied to the switching elements 13-1 to 13-4, so as to reduce the switching loss of the switching elements 13-1 to 13-4.

First, a description will be given of the control on the switching frequency and voltage of the AC power supplied from the power supply circuit 10 to the transmitter coil 14. As described above, the non-contact power feeding device 1 according to the embodiment does not utilize resonance on the power transmitter side, but has the same structure as the structure of a so-called primary series, secondary series capacitor type (SS type). Thus, the output voltage of the non-contact power feeding device 1 is similar in frequency characteristics to the output voltage of a non-contact power feeding device of the SS type.

Therefore, the control circuit 19 controls the switching frequency and voltage of the AC power applied to the transmitter coil 14 as described below in order to enable the constant voltage output action.

Upon receipt of the determination information representing that the measured value of the output voltage is out of the allowable range from the transceiver 18, the control circuit 19 changes the switching frequency of the AC power within a predetermined frequency range. The predetermined frequency range may be, for example, a frequency range from a lower-limit frequency at which, when the power transmitter device 2 feeds power to the power receiver device 3, constant voltage output is made with a possible minimum degree of coupling between the transmitter coil 14 and the receiver coil 21 to an upper-limit frequency at which constant voltage output is made with a possible maximum degree of coupling between the transmitter coil 14 and the receiver coil 21.

When changing the switching frequency, the control circuit 19 may increase the switching frequency from the lower limit to upper limit of the predetermined frequency range, or alternatively, may lower the switching frequency from the upper limit to lower limit of the predetermined frequency range. At this time, the control circuit 19 preferably changes the switching frequency stepwise to maintain the switching frequency constant for a period longer than a period in which the determination circuit 29 of the power receiver device 3 switches the switching element 28 to the on or off state, so as to allow the determination circuit 29 to check whether the output voltage becomes approximately constant.

When the determination information contained in the radio signal received from the power receiver device 3 via the transceiver 18 represents that the measured value of the output voltage is out of the allowable voltage range, but the output voltage becomes approximately constant even when the resistance of the load circuit 26 changes, the control circuit 19 maintains the switching frequency constant thereafter. Next, the control circuit 19 controls the DC voltage output from the power factor correction circuit 12 such that an approximately constant voltage is output to the load circuit 26 regardless of the switching frequency or degree of coupling at the switching frequency. This causes the voltage applied to the transmitter coil 14 to be adjusted such that the output voltage from the resonance circuit 20 is within the allowable voltage range, that is, an approximately constant voltage is output regardless of the degree of coupling. Then, when the determination information contained in the radio signal received from the power receiver device 3 via the transceiver 18 represents that the measured value of the output voltage is within the allowable voltage range, the control circuit 19 maintains the switching frequency and voltage of the AC power supplied to the transmitter coil 14 constant.

Note that the control circuit 19 may control the power factor correction circuit 12 to cause the voltage output from the power factor correction circuit 12 to gradually increase until the determination information contained in the radio signal received from the power receiver device 3 via the transceiver 18 indicates that the measured value of the output voltage is within the allowable voltage range.

Next, a description will be given of the control of the phase control circuit 16. Further, in order to increase energy transmission efficiency, it is preferable that the switching elements 13-1 to 13-4 of the power supply circuit 10 of the power transmitter device 2 be kept in soft switching (inductive) action. In order for the switching elements 13-1 to 13-4 to perform the soft switching action, it is preferable that the current flowing through the switching elements 13-1 to 13-4 be delayed in phase relative to the voltage applied to the switching elements 13-1 to 13-4. This causes a current to flow from the source terminal to drain terminal of the switching element 13-1 when the switching element 13-1 and the switching element 13-4 are switched to the on state, thereby bringing the switching elements 13-1, 13-4 of the power supply circuit 10 into the soft switching action.

Further, the smaller a peak value of the current flowing through the transmitter coil 14 when the switching elements 13-1 to 13-4 are switched from the on state to the off state (that is, when the switching elements 13-1 to 13-4 are turned off), the smaller the switching loss of the switching elements 13-1 to 13-4.

Figure 2A:
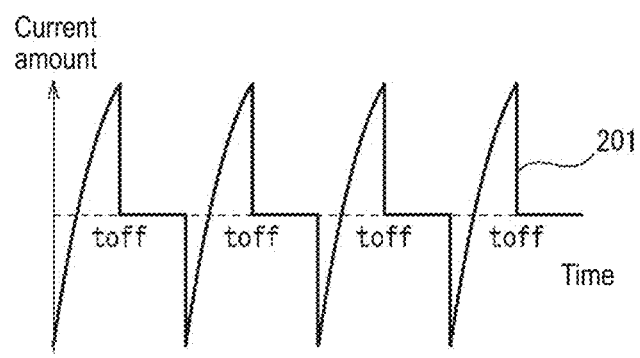
FIG. 2A is a diagram illustrating an example of a result of simulating a waveform of a current flowing through a transmitter coil.
Figure 2B:
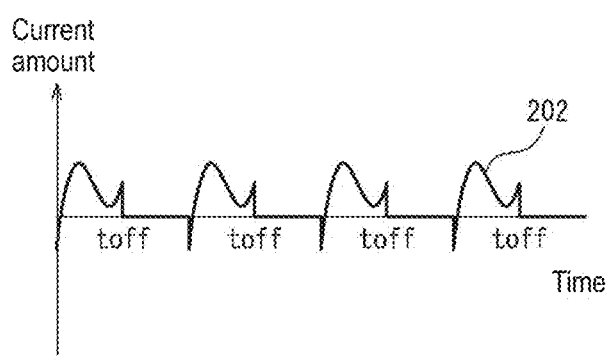
FIG. 2B is a diagram illustrating an example of a result of simulating a waveform of a current flowing through a transmitter coil.
Figure 2C:
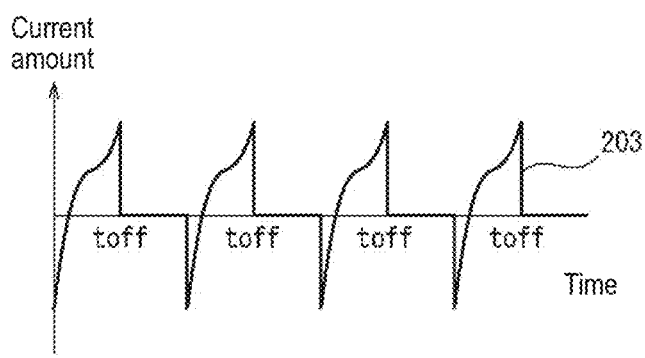
FIG. 2C is a diagram illustrating an example of a result of simulating a waveform of a current flowing through a transmitter coil.

FIGS. 2A, 2B, and 2C are diagrams each showing an example of a result of simulating the waveform of the current flowing through any of the switching elements 13-1 to 13-4. In each of FIGS. 2A, 2B, and 2C, the horizontal axis represents time, and the vertical axis represents the amount of current. In this simulation, the inductance Lp of the transmitter coil 14 and the inductance Ls of the receiver coil 21 were set to 220 μH. Further, the capacitance of the capacitor 15 was set to 440 nF, and the capacitance of the resonance capacitor 22 was set to 16.5 nF. Furthermore, the resistance Ro of the load circuit 26 was set to 8Ω, and the degree of coupling k between the transmitter coil 14 and the receiver coil 21 was set to 0.15. Then, the switching frequency of the AC power applied to the transmitter coil 14 was set to 84.5 kHz, and the voltage of the AC power was set to 270V.

A waveform 201 shown in FIG. 2A is a waveform, serving as a comparative example, of a current flowing through any of the switching elements 13-1 to 13-4 when the phase control circuit 16 is not connected. Further, a waveform 202 shown in FIG. 2B is a waveform of a current flowing through the transmitter coil 14 with the inductance of the coil of each LC series circuit of the phase control circuit 16 set to 220 μH, and the capacitance of the capacitor of the LC series circuit set to 11 nF (that is, the resonance frequency of the LC series circuit set to 102 kHz). Furthermore, a waveform 203 shown in FIG. 2C is a waveform of a current flowing through the transmitter coil 14 with the inductance of the coil of each LC series circuit of the phase control circuit 16 set to 220 μH, and the capacitance of the capacitor of the LC series circuit set to 8 nF (that is, the resonance frequency of the LC series circuit set to 120 kHz).

In FIGS. 2A, 2B, and 2C, a time toff is a timing at which a pair of switching elements to be switched to the on state at the same time among the switching elements 13-1 to 13-4 of the power supply circuit 10 are turned off. In the comparative example shown in FIG. 2A, the amount of current at the timing toff is 3.75A, and the effective value of the current flowing through the switching element of interest among the switching elements 13-1 to 13-4 is 1.65A. Further, in the example shown in FIG. 2B, the amount of current at the timing toff is 0.95A, and the effective value of the current flowing through the switching element of interest is 0.68A. In the example shown in FIG. 2C, the amount of current at the timing toff is 2.6A, and the effective value of the current flowing through the switching element of interest is 1.05A. The waveforms 201 to 203 show that the provision of the phase control circuit 16 leads to a reduction in the current peak value when the switching elements 13-1 to 13-4 of the power supply circuit 10 are turned off. Further, the effective value of the current flowing through the switching element of interest is also reduced. The above described configuration results in a reduction in both the switching loss and conduction loss of each switching element. Further, as shown in the waveforms 201 to 203, the resonance frequency of each LC series circuit of the phase control circuit 16 is preferably higher than the switching frequency of the AC power supplied to the transmitter coil 14, and more preferably less than twice the switching frequency.

This is due to the following reasons. That is, the amount of current flowing through the switching elements 13-1 to 13-4 is the sum of the amount of current flowing through the transmitter coil 14 and the amount of current flowing through each LC series circuit of the phase control circuit 16. The current flowing through the transmitter coil 14 is delayed in phase relative to the voltage applied to the switching elements 13-1 to 13-4. On the other hand, when the resonance frequency of each LC series circuit of the phase control circuit 16 is higher than the switching frequency of the AC power supplied to the transmitter coil 14, the current flowing through each LC series circuit is ahead in phase of the voltage applied to the switching elements 13-1 to 13-4. In particular, when the resonance frequency of each LC series circuit is less than twice the switching frequency of the AC power supplied to the transmitter coil 14, the switching elements 13-1 to 13-4 cause the current flowing through the transmitter coil 14 and the current flowing through each LC series circuit of the phase control circuit 16 to negate each other, and as a result, the effective value of the current flowing through the switching elements 13-1 to 13-4 is also reduced.

Therefore, the control circuit 19 compares, with the predetermined allowable range, the measured value of the amount of current detected by the current detection circuit 17 at the timing toff when any pair of switching elements to be switched to the on state at the same time among the switching elements 13-1 to 13-4 (for example, the switching elements 13-1 and 13-4) are turned off. Then, the control circuit 19 switches the switching elements S1$j$, S2$j$ of the LC series circuits 16-1, 16-2 to the on or off state when the measured value of the current amount is out of the allowable range. Note that the lower limit of the allowable range can be determined, for example, by adding a predetermined offset to zero. This makes the current flowing through the switching elements 13-1 to 13-4 ahead in phase of the voltage applied to the switching elements 13-1 to 13-4 and in turn prevents the switching elements 13-1 to 13-4 from being hard-switched. Further, when the phase control circuit 16 is not provided, the upper limit of the allowable range is set smaller than the measured value of the amount of current detected by the current detection circuit 17 at the timing toff.

Regarding the switching of the switching elements S1$j$, S2$j$ to the on or off state, the control circuit 19 only needs to perform the same switching process on the two LC series circuits 16-1, 16-2. A description will be given below of how to switch the switching element S1$j$ of the LC series circuit 16-1 to the on or off state.

For example, with all of the switching elements S1$j$ in the off state, the control circuit 19 switches any of the switching elements S1$j$ to the on state when the measured value of the current amount is out of the allowable range. Further, with all of the switching elements S1$j$ in the on state, the control circuit 19 switches any of the switching elements S1$j$ to the off state when the measured value of the current amount is out of the allowable range. Further, with any of the switching elements S1j in the on state and the other switching elements in the off state, the control circuit 19 switches any of the switching elements S1j that are in the off state to the on state when the measured value of the current amount is out of the allowable range. When the measured value of the amount of current remains out of the allowable range even with an increase in the number of switching elements that are in the on state, the control circuit 19 switches the switching element switched to the on state immediately before to the off state together with the switching elements switched to the on state previously. When at least two switching elements S1j are provided, the control circuit 19 switches the switching elements S1j to the on state one by one until the measured value of the current amount falls within the allowable range. When the measured value of the amount of current remains out of the allowable range even with all the switching elements S1j in the on state, the control circuit 19 only needs to switch the switching elements S1j to the off state one by one until the measured value of the current amount falls within the allowable range.

Further, when the measured value of the amount of current at the timing toff is within the predetermined allowable range, the control circuit 19 switches none of the switching elements S1j on or off.

This allows the control circuit 19 to adjust the resonance frequency of each LC series circuit of the phase control circuit 16 to adjust the amount of phase delay of the current flowing through the switching elements 13-1 to 13-4 relative to the phase of the voltage applied to the switching elements 13-1 to 13-4 so as to reduce the switching loss and conduction loss of the switching elements 13-1 to 13-4.

Figure 3:
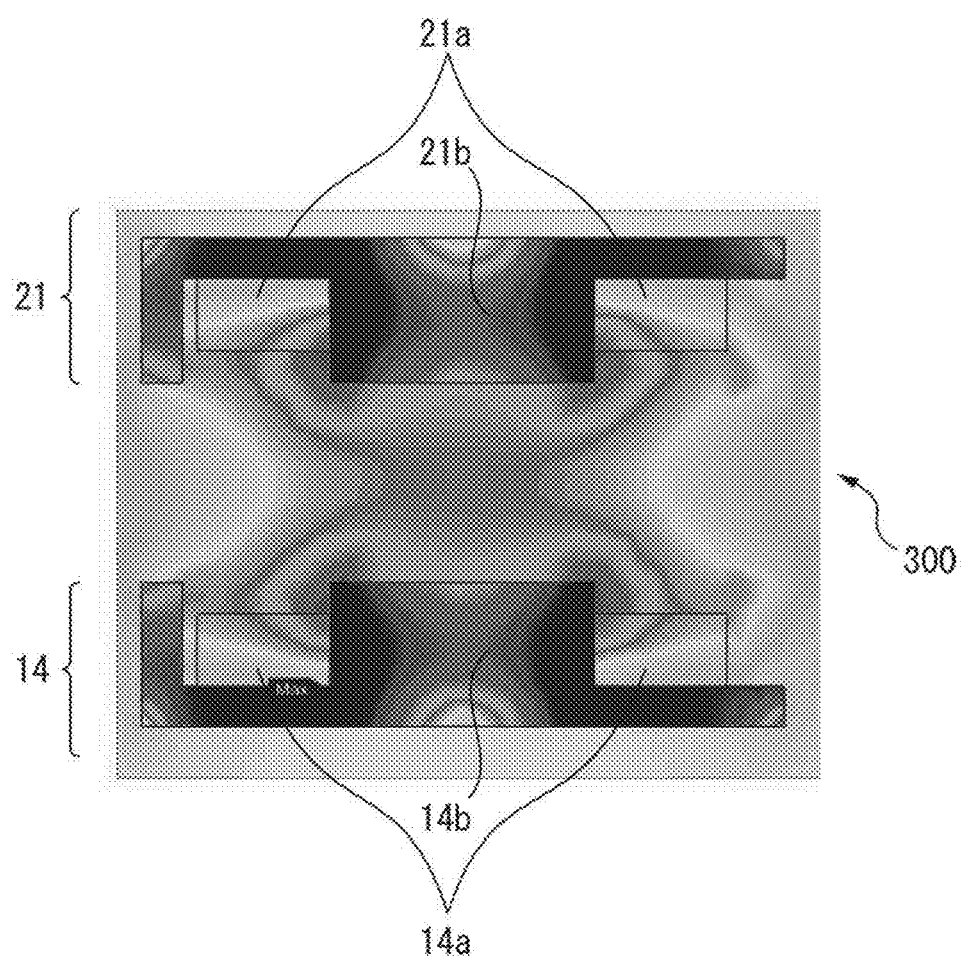
FIG. 3 is a diagram illustrating a simulation result showing an example of a magnetic field intensity distribution according to one or more embodiments.

FIG. 3 is a diagram of a simulation result showing an example of magnetic field intensity distribution according to the embodiment. The simulation shown in FIG. 3 was performed under the same conditions as the simulation shown in FIG. 2B. In magnetic field intensity distribution 300 shown in FIG. 3, the darker the area, the stronger the magnetic field. The intensity distribution 300 shows that the strength of the magnetic field generated around the transmitter coil 14 and the strength of the magnetic field generated around the receiver coil 21 are approximately equal to each other.

Note that, in this simulation, when an aluminum piece having a thickness of 0.5 mm and a width of 10 mm is present on a surface, adjacent to the receiver coil 21, of a core 14b on which a winding wire 14a of the transmitter coil 14 is wound, a loss of 99.9 mW occurs. On the other hand, when an aluminum piece having a thickness of 0.5 mm and a width of 10 mm is present on a surface, adjacent to the transmitter coil 14, of a core 21b on which a winding wire 21a of the receiver coil 21 is wound, a loss of 100.1 mW occurs. As described above, regardless of whether foreign matter is present adjacent to the transmitter or the receiver, the loss caused by the foreign matter is about the same.

Figure 4:
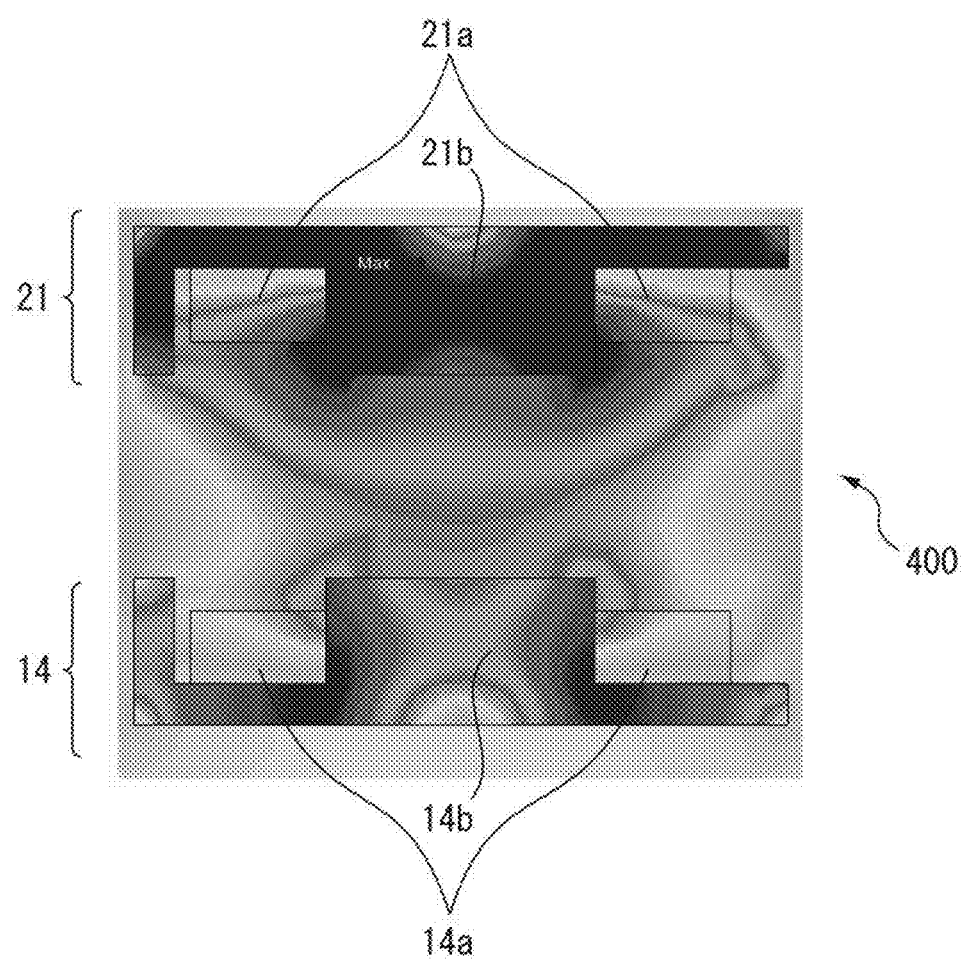
FIG. 4 is a diagram illustrating a simulation result showing an example of a magnetic field intensity distribution according to a comparative example.

FIG. 4 is a diagram of a simulation result showing an example of magnetic field intensity distribution according to the comparative example. The simulation shown in FIG. 4 was performed under the conditions where the phase control circuit 16 is not provided, that is, the same conditions as the simulation shown in FIG. 2A. In magnetic field intensity distribution 400 shown in FIG. 4, the darker the area, the stronger the magnetic field. The intensity distribution 400 shows that the magnetic field generated around the receiver coil 21 is stronger than the magnetic field generated around the transmitter coil 14, and there is a difference in strength of the magnetic field between the transmitter coil 14 and the receiver coil 21.

In this simulation, when an aluminum piece having a thickness of 0.5 mm and a width of 10 mm is present on the surface, adjacent to the receiver coil 21, of the core 14b on which the winding wire 14a of the transmitter coil 14 is wound, a loss of 28 mW occurs. On the other hand, when an aluminum piece having a thickness of 0.5 mm and a width of 10 mm is present on the surface, adjacent to the transmitter coil 14, of the core 21b on which the winding wire 21a of the receiver coil 21 is wound, a loss of 302 mW occurs.

As described above, according to the comparative example, when foreign matter is present adjacent to the receiver coil 21 where the magnetic field generated is stronger, a large loss occurs, and as a result, the amount of heat generated by the foreign matter increases, whereas according to the embodiment, even when foreign matter is present between the transmitter coil 14 and the receiver coil 21, a loss is relatively small, and generation of heat by the foreign matter is suppressed.

As described above, this non-contact power feeding device includes the LC series circuit connected to both the ends of the transmitter coil of the power transmitter device. The non-contact power feeding device adjusts the capacitance of the capacitor of the LC series circuit in accordance with the current flowing through each switching element of the power supply circuit that supplies the AC power to the transmitter coil at the timing when the switching element is turned off to control the resonance frequency of the LC series circuit, so as to control the amount of phase delay of the current flowing through each switching element relative to the phase of the voltage applied to the switching element in a suitable manner. This allows the non-contact power feeding device to reduce the switching loss and conduction loss of each switching element of the power supply circuit without increasing the Q factor of the resonance circuit of the power receiver device. As a result, the non-contact power feeding device can reduce not only the number of turns of the receiver coil of the resonance circuit of the power receiver device, but also a withstanding voltage required for the receiver coil and the resonance capacitor. Therefore, even when power is transmitted by resonance of the resonance circuit of the power receiver device that mainly resonates with the AC power supplied to the transmitter coil, the non-contact power feeding device reduces deflection of magnetic flux between the transmitter coil and the receiver coil and prevents the occurrence of abnormality such as abnormal heat generation even when foreign matter is present between the transmitter coil and the receiver coil. Further, since the number of turns of the receiver coil of the non-contact power feeding device can be reduced, the receiver coil can be downsized, and the entire power receiver device can be downsized accordingly. Further, since the non-contact power feeding device can reduce the switching loss of each switching element of the power supply circuit even when the degree of coupling between the transmitter coil and the receiver coil is low, the distance between the power transmitter device and the power receiver device during power transmission, that is, a power transmission distance, can be increased.

According to the modification, each LC series circuit of the phase control circuit 16 may include n (n is an integer equal to or greater than 2) coils connected in parallel to each other and a switching element such as a MOSFET connected in series with each of (n−1) coils among the n coils. Note that, in each LC series circuit, one capacitor may be connected in series with each coil, or alternatively, n capacitors may be each connected in series with a different coil. Also in this case, the resonance frequency of each LC series circuit changes in a manner that depends on the number of switching elements to be switched to the on state among the switching elements of each LC series circuit. This causes, in accordance with the number of switching elements to be switched to the on state among the switching elements of each LC series circuit, the amount of phase delay of the current flowing through the switching elements 13-1 to 13-4 of the power supply circuit 10 relative to the phase of the voltage applied to the switching elements 13-1 to 13-4 to be controlled. Therefore, the control circuit 19 only needs to control the switching of the switching element of each LC series circuit to the on or off state in accordance with the amount of current flowing through the switching elements 13-1 to 13-4 of the power supply circuit 10 as in the above-described embodiment.

As described above, the resonance frequency of each LC series circuit of the phase control circuit 16 is preferably higher than the switching frequency of the AC power supplied to the transmitter coil 14. Therefore, according to the modification, the control circuit 19 of the power transmitter device 2 may determine, based on the switching frequency of the AC power supplied from the power supply circuit 10 to the transmitter coil 14 during the constant voltage output action, which of the switching elements S1j, S2j of each LC series circuit of the phase control circuit 16 is switched to the on state so as to make the resonance frequency of the LC series circuit higher than the switching frequency. In this case, it is required that the control circuit 19 store, in advance, a reference table representing the switching frequency of the AC power supplied to the transmitter coil 14 and pairs of switching elements to be switched to the on state among the switching elements S1j, S2j of each LC series circuit of the phase control circuit 16. Then, it is required that the control circuit 19 consult the reference table to determine a pair of switching elements to be switched to the on state among the switching elements S1j, S2j of each LC series circuit, the pair of switching elements being associated with the switching frequency of the AC power supplied to the transmitter coil 14, and switch each of the switching elements forming the pair thus determined to the on state.

According to this modification, the control circuit 19 of the power transmitter device 2 can adjust the resonance frequency of each LC series circuit to control the amount of phase delay of the current flowing through each switching element of the power supply circuit relative to the phase of the voltage applied to the switching element of the power supply circuit in a suitable manner. This allows the control circuit 19 to reduce the switching loss and conduction loss of each switching element of the power supply circuit. Further, this modification may eliminate the need of the current detection circuit 17.

Further, when the degree of coupling between the transmitter coil 14 and the receiver coil 21 becomes higher, the amount of phase delay of the current flowing through the switching elements 13-1 to 13-4 of the power supply circuit 10 relative to the phase of the voltage applied to the switching elements 13-1 to 13-4 becomes an amount of phase delay that makes the switching loss of the switching elements 13-1 to 13-4 smaller even without the phase control circuit. Therefore, according to another modification, each LC series circuit of the phase control circuit may be switched to the on or off state in accordance with the degree of coupling between the transmitter coil 14 and the receiver coil 21.

Figure 5:
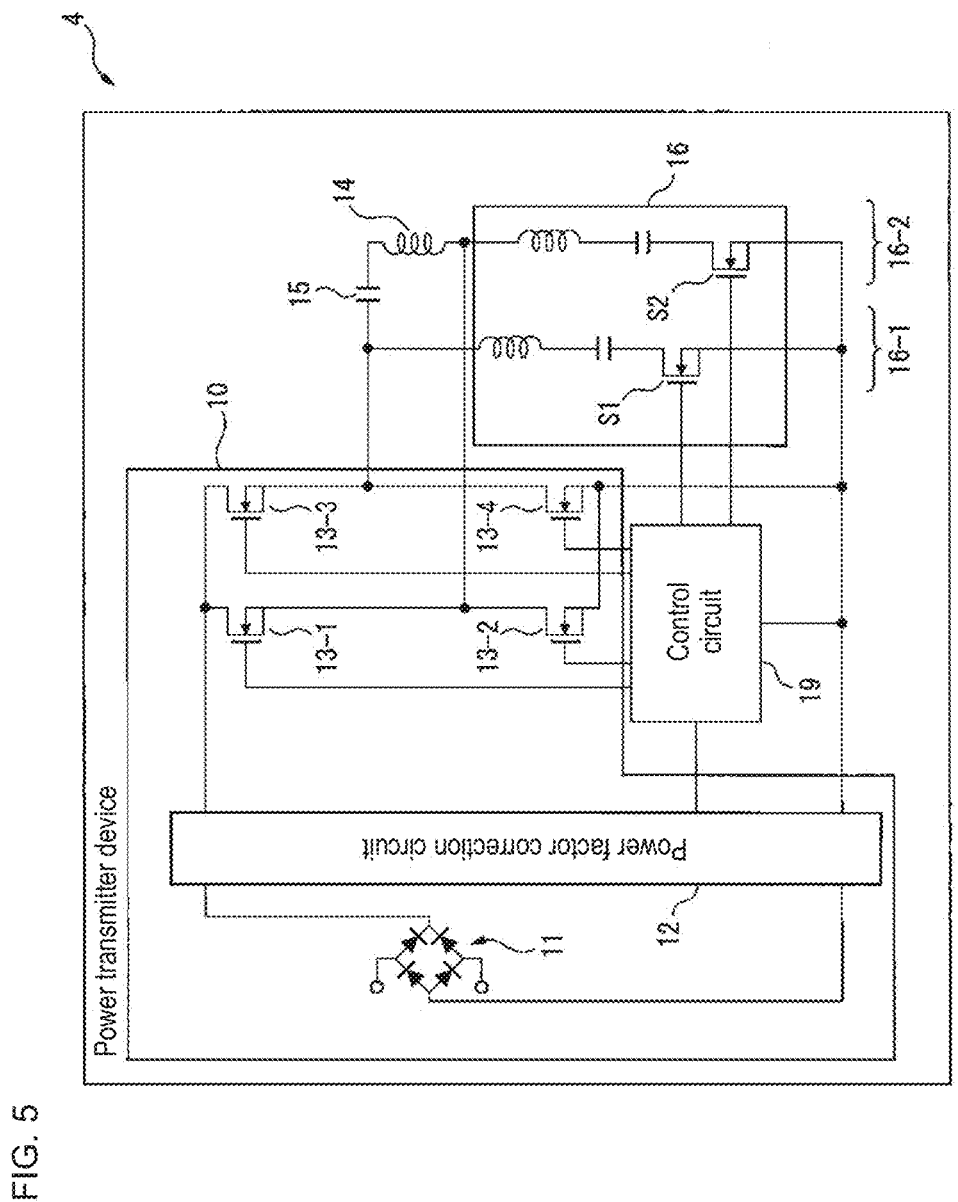
FIG. 5 is a schematic structure diagram illustrating a power transmitter device according to a modification.

FIG. 5 is a schematic structure diagram of a power transmitter device 4 according to this modification. In FIG. 5, the transceiver 18 is not shown for the sake of simplicity. The power transmitter device 4 according to this modification is different from the power transmitter device 2 shown in FIG. 1 in that each of the LC series circuits 16-1, 16-2 of the phase control circuit 16 of the power transmitter device 4 includes one capacitor and one switching element, the power transmitter device 4 is not provided with the current detection circuit 17, and how the control circuit 19 controls the phase control circuit 16. Thus, a description will be given below of these differences. For the other components of the power transmitter device 4, refer to the description of the corresponding components according to the above-described embodiment.

According to this modification, the control circuit 19 switches the switching elements S1, S2 of the LC series circuits 16-1, 16-2 to the off state when the degree of coupling between the transmitter coil 14 and the receiver coil 21 becomes equal to or greater than a predetermined value to isolate the LC series circuits 16-1, 16-2 from the transmitter coil 14, so as to prevent the LC series circuits 16-1, 16-2 from affecting the amount of phase delay. On the other hand, the control circuit 19 switches the switching elements S1, S2 of the LC series circuits 16-1, 16-2 to the on state when the degree of coupling between the transmitter coil 14 and the receiver coil 21 becomes less than the predetermined value to adjust the amount of phase delay, so as to reduce the switching loss of the switching elements 13-1 to 13-4 of the power supply circuit 10.

Specifically, the higher the degree of coupling between the transmitter coil 14 and the receiver coil 21, the higher the switching frequency of the AC power supplied from the power supply circuit 10 to the transmitter coil 14 while the non-contact power feeding device 1 is in the constant voltage output action, and the lower the voltage of the AC power supplied from the power supply circuit 10 to the transmitter coil 14. Therefore, the control circuit 19 switches the switching elements S1, S2 of the LC series circuits 16-1, 16-2 to the off state when the switching frequency of the AC power supplied from the power supply circuit 10 to the transmitter coil 14 while the non-contact power feeding device 1 is in the constant voltage output action becomes equal to or greater than a frequency threshold corresponding to the predetermined value of the degree of coupling. On the other hand, the control circuit 19 switches the switching elements S1, S2 of the LC series circuits 16-1, 16-2 to the on state when the switching frequency of the AC power supplied from the power supply circuit 10 to the transmitter coil 14 while the non-contact power feeding device 1 is in the constant voltage output action becomes less than the frequency threshold.

Alternatively, the control circuit 19 may switch the switching elements S1, S2 of the LC series circuits 16-1, 16-2 to the off state when the voltage of the AC power supplied from the power supply circuit 10 to the transmitter coil 14 while the non-contact power feeding device 1 is in the constant voltage output action becomes equal to or less than a voltage threshold corresponding to the predetermined value of the degree of coupling On the other hand, the control circuit 19 may switch the switching elements S1, S2 of the LC series circuits 16-1, 16-2 to the on state when the voltage of the AC power supplied from the power supply circuit 10 to the transmitter coil 14 while the non-contact power feeding device 1 is in the constant voltage output action becomes greater than the voltage threshold. Note that the control circuit 19 can estimate the voltage of the AC power supplied from the power supply circuit 10 to the transmitter coil 14 based on, for example, a control parameter of the power factor correction circuit of the power supply circuit 10 (for example, a duty cycle of on/off switching of the switching element of the power factor correction circuit).

This modification makes the structure of the phase control circuit simple, so that the power transmitter device is downsized. Further, the control of the phase control circuit under the control of the control circuit of the power transmitter device can be made simple. Furthermore, this modification allows the non-contact power feeding device to reduce, even when the degree of coupling between the transmitter coil and the receiver coil changes, particularly, when the degree of coupling decreases, the switching loss of each switching element of the power supply circuit.

According to yet another modification, the LC series circuit of the phase control circuit may be connected in parallel with the transmitter coil 14.

Figure 6:
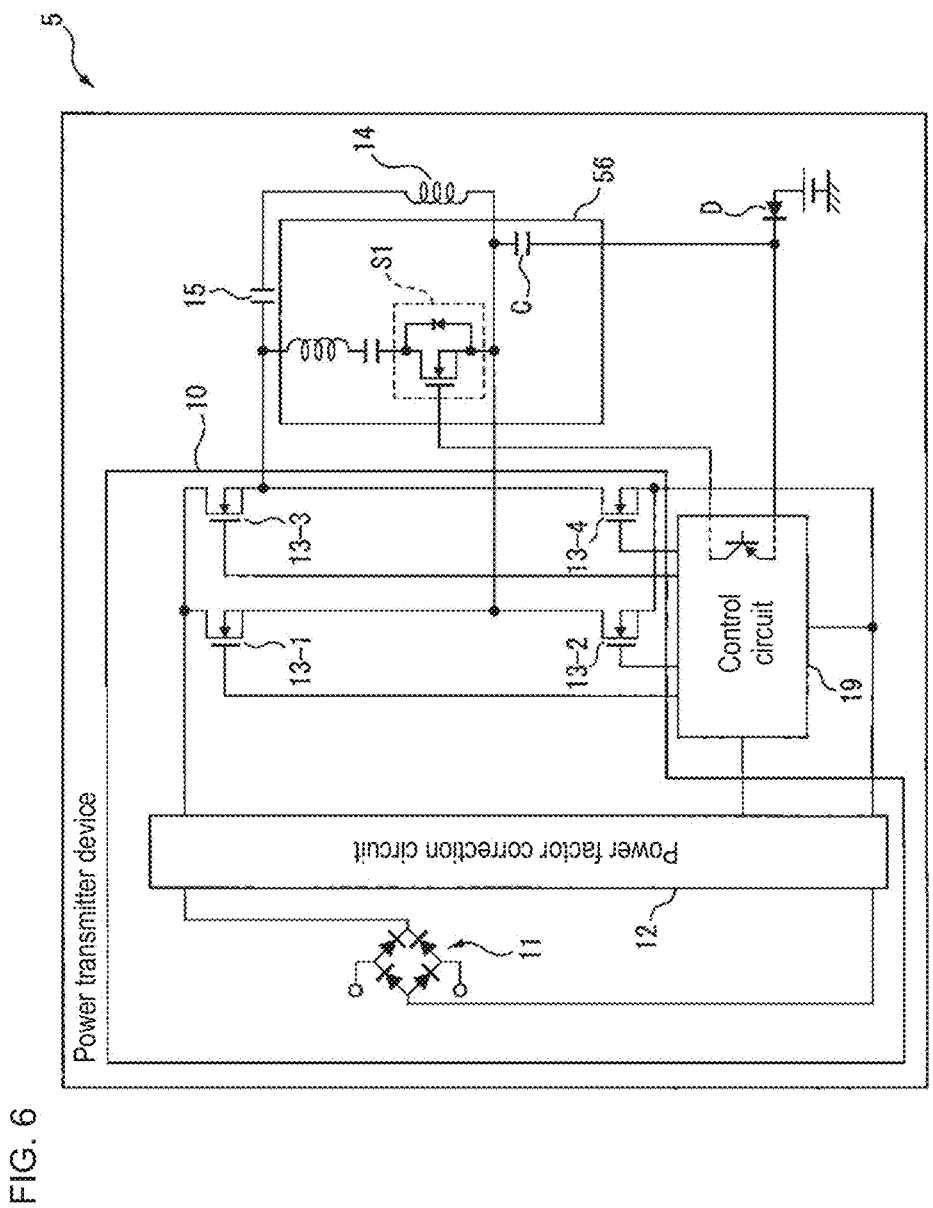
FIG. 6 is a schematic structure diagram illustrating a power transmitter device according to another modification.

FIG. 6 is a schematic structure diagram of a power transmitter device 5 according to yet another modification. In FIG. 6, the transceiver 18 is not shown for the sake of simplicity. The power transmitter device 5 according to this modification is different from the power transmitter device 4 shown in FIG. 5 in the structure of a phase control circuit 56. Thus, a description will be given below of the phase control circuit 56 and components related to the phase control circuit 56. For the other components of the power transmitter device 5, refer to the description of the corresponding components according to the above-described embodiment or modification.

The phase control circuit 56 includes one LC series circuit, and the LC series circuit has one end connected to the one end of the transmitter coil 14 via the capacitor 15 and has the other end connected to the other end of the transmitter coil 14. Further, the switching element S1 connected in series with the LC series circuit includes an n-channel MOSFET. According to this modification, a potential across the LC series circuit fluctuates. Therefore, in order to allow the switching element S1 of the LC series circuit to be switched to the on or off state as in the modification shown in FIG. 4, the phase control circuit 56 includes a constant voltage source having a negative electrode grounded, a diode D biased by the constant voltage source, and a capacitor C having one end connected to the other end of the LC series circuit and the other end of the transmitter coil 14 and having the other end connected to a cathode terminal of the diode D. This makes a voltage at a gate terminal of the MOSFET of the switching element S1 of the phase control circuit 56 higher than a voltage at a source terminal by at least a certain amount, allowing the control circuit 19 to switch the switching element S1 to the on or off state as in the modification shown in FIG. 4. Note that, according to this modification, a current detection circuit that measures the amount of current flowing through the switching elements 13-1 to 13-4 may be provided as in the power transmitter device 2. In this case, the control circuit 19 may switch the switching element S1 to the on state when the measured value of the amount of current flowing through the switching elements 13-1 to 13-4 at the timing when any of the switching elements of the power supply circuit is turned off becomes equal to or greater than the predetermined threshold, and switch the switching element S1 to the off state when the measured value of the amount of current becomes less than the predetermined threshold.

According to this modification, only one LC series circuit is provided in the phase control circuit, so that the power transmitter device is further downsized.

Note that, in the power transmitter device 5, when the switching element S1 of the phase control circuit 56 is switched to the off state, an unintended current may flow through the transmitter coil 14 due to a counter electromotive force generated in a coil of the LC series circuit of the phase control circuit 56. Therefore, according to yet another modification, a bypass circuit may be further provided, the bypass circuit giving a bypass to the current flowing due to the counter electromotive force generated in the coil of the LC series circuit of the phase control circuit 56. Further, in order to reduce the voltage applied to the switching element S1 while the switching element S1 is in the off state, a capacitor connected in parallel with the switching element S1 may be further provided.

Figure 7:
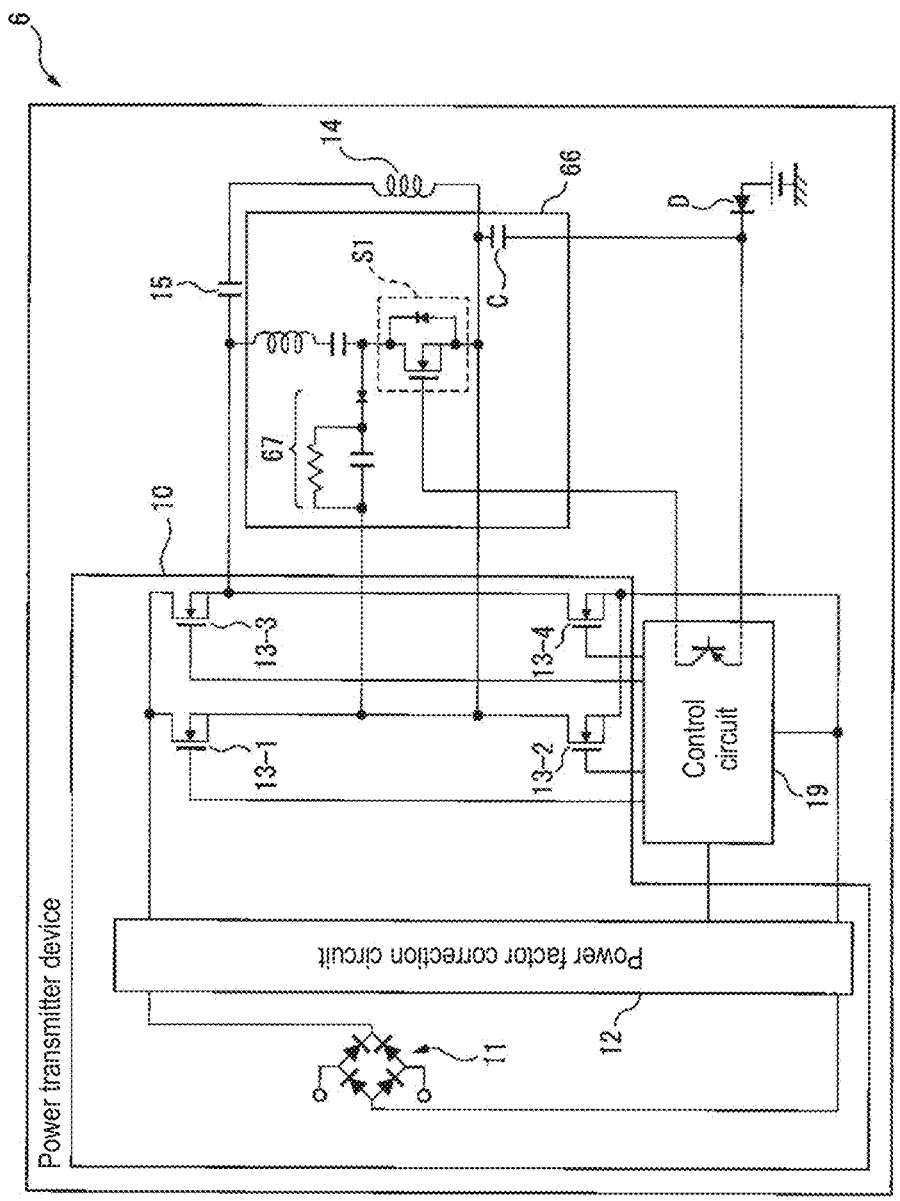
FIG. 7 is a schematic structure diagram illustrating a power transmitter device according to another modification.

FIG. 7 is a schematic structure diagram of a power transmitter device 6 according to yet another modification. In FIG. 7, the transceiver 18 is not shown for the sake of simplicity. The power transmitter device 6 according to this modification is different from the power transmitter device 5 shown in FIG. 6 in that a phase control circuit 66 includes a bypass circuit 67. Thus, a description will be given below of the phase control circuit 66 and components related to the phase control circuit 66. For the other components of the power transmitter device 6, refer to the description of the corresponding components according to the above-described embodiment or modifications.

According to this modification, the phase control circuit 66 includes the bypass circuit 67 connected between one end of a capacitor to which the coil of the LC series circuit is not connected and the source terminal of the switching element 13-1 of the power supply circuit 10. The bypass circuit 67 includes a diode having an anode terminal connected to the capacitor of the LC series circuit, a capacitor connected between the diode and the source terminal of the switching element 13-1, and a resistor connected in parallel with the capacitor.

When the switching element S1 of the phase control circuit 66 is switched from the on state to the off state, a current generated by a counter electromotive force in the coil of the LC series circuit of the phase control circuit 66 flows to the capacitor of the bypass circuit 67 through the diode of the bypass circuit 67. Further, the switching element S1 is reverse-biased with respect to the current generated by the counter electromotive force, preventing the current from flowing through the switching element S1. Therefore, the current generated by the counter electromotive force is prevented from flowing toward the transmitter coil 14. Note that electric charge stored in the capacitor of the bypass circuit 67 is consumed by the resistor connected in parallel with the capacitor.

According to this modification, an unintended current is prevented from flowing through the transmitter coil due to the counter electromotive force generated in the coil of the LC series circuit of the phase control circuit.

According to yet another modification, the power supply circuit may convert DC power output from the power factor correction circuit into AC power by using a half-bridge circuit including a plurality of switching elements connected in a half-bridge configuration.

Figure 8:
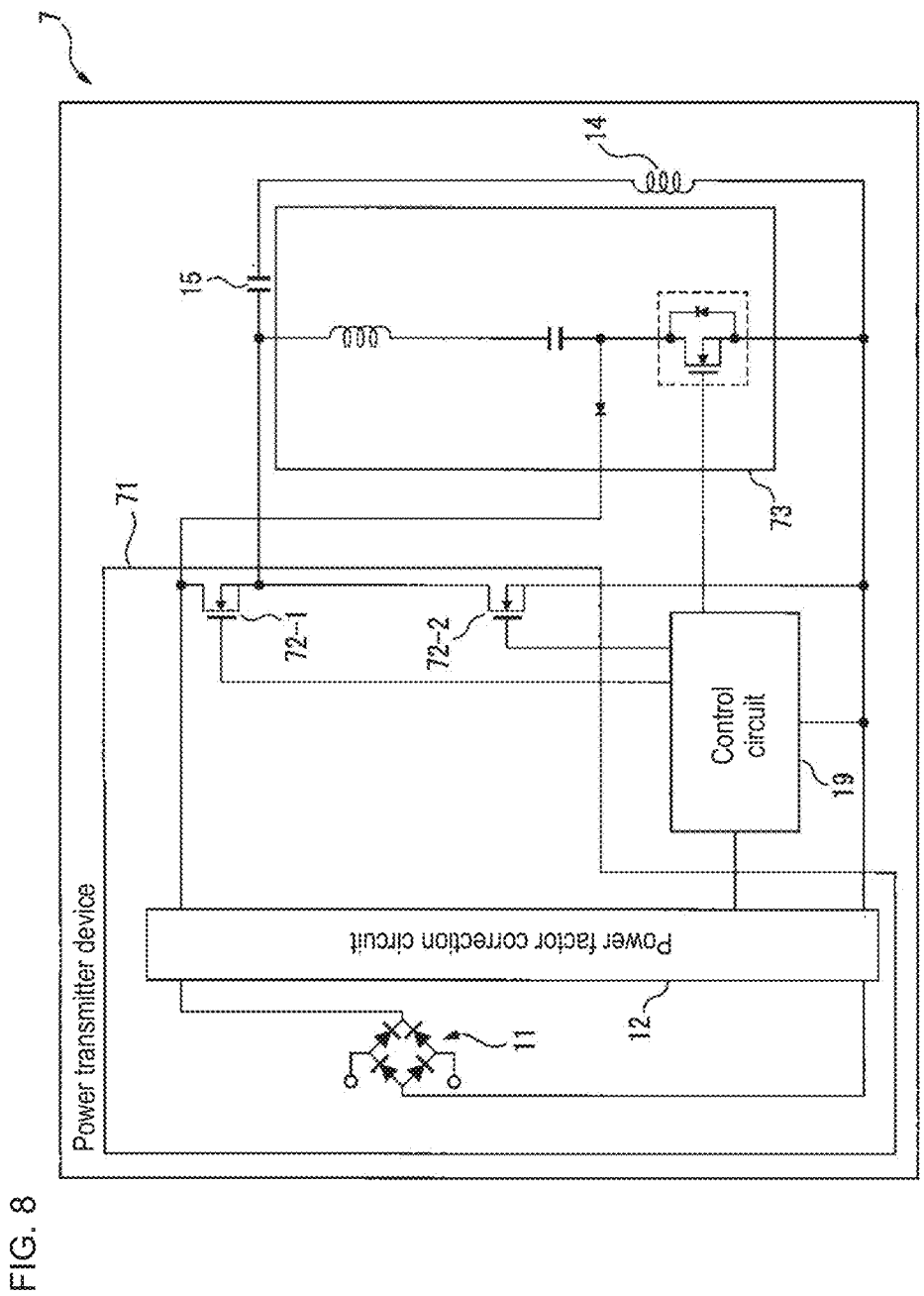
FIG. 8 is a schematic structure diagram illustrating a power transmitter device according to another modification.

FIG. 8 is a schematic structure diagram of a power transmitter device 7 according to yet another modification. In FIG. 8, the transceiver 18 is not shown for the sake of simplicity. The power transmitter device 7 according to this modification is different from the power transmitter device 5 shown in FIG. 6 in that a power supply circuit 71 includes two switching elements 72-1, 72-2 serving as the half-bridge circuit and in the structure of a phase control circuit 73. Thus, a description will be given below of the power supply circuit 71, the phase control circuit 73, and components related to the power supply circuit 71 and the phase control circuit 73. For the other components of the power transmitter device 7, refer to the description of the corresponding components in the above-described embodiment or modifications.

Note that, according to this modification, each of the switching elements 72-1, 72-2 may also be, for example, an n-channel MOSFET. The switching element 72-1 and the switching element 72-2 are connected in series between the positive electrode terminal and negative electrode terminal of the power supply 11 via the power factor correction circuit 12. Further, the switching element 72-1 is connected to the positive electrode of the power supply 11, and the switching element 72-2 is connected to the negative electrode of the power supply 11. The switching element 72-1 has a drain terminal connected to the positive electrode terminal of the power supply 11 via the power factor correction circuit 12 and has a source terminal connected to a drain terminal of the switching element 72-2. Further, the switching element 72-2 has a source terminal connected to the negative electrode terminal of the power supply 11 via the power factor correction circuit 12. Further, the source terminal of the switching element 72-1 and the drain terminal of the switching element 72-2 are connected to the one end of the transmitter coil 14 via the capacitor 15, and the source terminal of the switching element 72-2 is connected to the other end of the transmitter coil 14. Further, each of the switching elements has a gate terminal connected to the control circuit 19.

According to this modification, the control circuit 19 only needs to alternately switch the switching element 72-1 and the switching element 72-2 to the on or off state. That is, when the switching element 72-1 is switched to the on state and the switching element 72-2 is switched to the off state, a current from the power supply 11 through the power factor correction circuit 12 and the switching element 72-1 not only charges the capacitor 15 but also flows through the transmitter coil 14. On the other hand, when the switching element 72-1 is switched to the off state and the switching element 72-2 is switched to the on state, the capacitor 15 is discharged to cause a current to flow from the capacitor 15 through the transmitter coil 14. Therefore, according to this modification, the control circuit 19 only needs to control a switching frequency at which the switching element 72-1 and the switching element 72-2 are switched to the on or off state in accordance with determination information received from the power receiver device 3.

Further, according to this modification, an LC series circuit of the phase control circuit 73 is connected in parallel with the transmitter coil 14. Specifically, the LC series circuit has one end connected between the source terminal of the switching element 72-1 and the drain terminal of the switching element 72-2, and the capacitor 15 and has the other end connected to a terminal of the transmitter coil 14 on a side opposite from the capacitor 15 and the negative electrode terminal of the power supply 11. That is, according to this modification, the LC series circuit has the other end grounded. Further, the phase control circuit 73 includes a diode having an anode terminal connected between the capacitor of the LC series circuit and the other end of the transmitter coil 14 and has a cathode terminal connected to the positive electrode terminal of the power supply 11. This causes the current flowing due to the counter electromotive force generated in the coil of the LC series circuit when the LC series circuit is turned off to be used to charge the capacitor 15 via the diode and the switching element 72-1, preventing an unintended current from flowing through the transmitter coil. This in turn allows the control circuit 19 to switch the switching element of the LC series circuit of the phase control circuit 73 to the on or off state in a similar manner to the switching element of each LC series circuit of the phase control circuit 16 of the power transmitter device 2.

Note that according to the embodiment or each of the modifications described above, one end of the LC series circuit of the phase control circuit connected to the capacitor 15 may be connected between the capacitor 15 and the transmitter coil 14.

Further, according to one or more embodiments or any of the modifications described above, on the assumption that the degree of coupling between the transmitter coil and the receiver coil is approximately constant, for example, when the power transmitter device and the power receiver device are installed such that a positional relationship between the power transmitter device and the power receiver device is stably maintained, the control circuit of the power transmitter device may keep the switching frequency of the AC power supplied from the power supply circuit to the transmitter coil constant. Keeping a constant switching frequency may eliminate the need for the LC series circuit of the phase control circuit of the power transmitter device to include a switching element. That is, the control circuit of the power transmitter device need not switch the LC series circuit of the phase control circuit to the on or off state or control the resonance frequency of the LC series circuit. Accordingly, the inductance of the coil and the capacitance of the capacitor of the LC series circuit need only be set to make the resonance frequency of the LC series circuit higher than the switching frequency, which may eliminate the need of the transceiver 18 of the power transmitter device, and the voltage detection circuit 27, the switching element 28, the determination circuit 29, and the transceiver 30 of the power receiver device. The above described arrangement may further eliminate the need for the power supply circuit of the power transmitter device to include a power factor correction circuit. Furthermore, the power supply circuit of the power transmitter device may include a smoothing capacitor that smooths the output voltage from the full-wave rectifying circuit of the power supply 11 instead of the power factor correction circuit, and further, the power supply circuit of the power transmitter device may include a DC-DC converter such that the voltage applied to the transmitter coil 14 becomes a voltage based on the specifications of the load circuit 26 and the degree of coupling between the transmitter coil 14 and the receiver coil 21.

Further, according to the embodiment or each of the modifications described above, the receiver coil and the resonance capacitor may be connected in parallel in the resonance circuit of the power receiver device. As described above, when the resonance circuit of the power receiver device is an LC parallel resonance circuit, the resistance of the load circuit needs to be higher in order to increase the Q factor. However, with the non-contact power feeding device according to the embodiment or each of the modifications described above, even when the resonance circuit of the power receiver device is an LC parallel resonance circuit, it is not necessary to increase the Q factor, so that even when a load circuit having low resistance is connected, the switching loss of the power supply circuit of the power transmitter device can be reduced.

As described above, those skilled in the art may make various modifications according to the embodiments within the scope of the present invention.

DESCRIPTION OF SYMBOLS 1 non-contact power feeding device
2, 4-7 power transmitter device
10, 71 power supply circuit
11 power supply
12 power factor correction circuit
13-1 to 13-4, 72-1 to 72-2 switching element
14 transmitter coil
15 capacitor
16, 56, 66, 73 phase control circuit
16-1, 16-2 LC series circuit
67 bypass circuit
17 current detection circuit
18 transceiver
19 control circuit
3 power receiver device
20 resonance circuit
21 receiver coil
22 resonance capacitor
23 rectifying and smoothing circuit
24 full-wave rectifying circuit
25 smoothing capacitor
26 load circuit
27 voltage detection circuit
28 switching element
29 determination circuit
30 transceiver

The invention claimed is:

1. A non-contact power feeding device comprising:
a power transmitter device; and
a power receiver device to which the power transmitter device transmits power in a non-contact manner, wherein
the power transmitter device comprises
a transmitter coil configured to supply power to the power receiver device,
a power supply circuit comprising a plurality of switching elements connected between a DC power supply and the transmitter coil in a full-bridge configuration or a half-bridge configuration, the power supply circuit being configured to switch the plurality of switching elements to an on or off state at a switching frequency to convert DC power supplied from the DC power supply into AC power having the switching frequency and supply the AC power to the transmitter coil, and
a phase control circuit comprising at least one LC series circuit connected to both ends of the transmitter coil, wherein a resonance frequency of each of the at least one LC series circuit is higher than the switching frequency and less than twice the switching frequency, and wherein
each of the at least one LC series circuit of the phase control circuit comprises a coil, a first capacitor and a second capacitor connected in series with the coil and connected in parallel with each other, and a switching element connected in series with the second capacitor, the switching element being configured to connect the second capacitor to the coil in response to being switched to the on state and to separate the second capacitor from the coil in response to being switched to the off state, and
the power transmitter device further comprises
a current detection circuit configured to obtain a measured value of an amount of current flowing through the plurality of switching elements, and
a control circuit configured to switch the switching element of each of the at least one LC series circuit to the on or off state to bring the measured value of the amount of current within a predetermined allowable range in response to any of the plurality of switching elements of the power supply circuit being turned off.

2. The non-contact power feeding device according to claim 1, wherein the at least one LC series circuit has a first end connected to a first end of the transmitter coil and has a second end connected to a second end of the transmitter coil.

3. The non-contact power feeding device according to claim 1, wherein the at least one LC series circuit comprises a first LC series circuit having first end connected to a first end of the transmitter coil and having a second end grounded, and a second LC series circuit having a first end connected to a second end of the transmitter coil and having a second end grounded.

4. A non-contact power feeding device comprising:
a power transmitter device; and
a power receiver device to which the power transmitter device transmits power in a non-contact manner, wherein
the power transmitter device comprises
a transmitter coil configured to supply power to the power receiver device,
a power supply circuit comprising a plurality of switching elements connected between a DC power supply and the transmitter coil in a full-bridge configuration or a half-bridge configuration, the power supply circuit being configured to switch the plurality of switching elements to an on or off state at a switching frequency to convert DC power supplied from the DC power supply into AC power having the switching frequency and supply the AC power to the transmitter coil, and
a phase control circuit comprising at least one LC series circuit connected to both ends of the transmitter coil, wherein a resonance frequency of each of the at least one LC series circuit is higher than the switching frequency and less than twice the switching frequency, and wherein
each of the at least one LC series circuit of the phase control circuit comprises a coil, a first capacitor and a second capacitor connected in series with the coil and connected in parallel with each other, and a switching element connected in series with the second capacitor, the switching element being configured to connect the second capacitor to the coil in response to being switched to the on state and to separate the second capacitor from the coil in response to being switched to the off state, and
the power transmitter device further comprises a control circuit configured to control the switching frequency at which the plurality of switching elements of the power supply circuit are switched to the on or off state and to switch the switching element of each of the at least one LC series circuit to the on or off state in accordance with the switching frequency of the AC power supplied from the power supply circuit to the transmitter coil while the non-contact power feeding device is in constant voltage output action.

5. The non-contact power feeding device according to claim 4, wherein the control circuit switches the switching element of each of the at least one LC series circuit to the on or off state to make a resonance frequency of each of the at least one LC series circuit higher than the switching frequency.

6. The non-contact power feeding device according to claim 4, wherein the at least one LC series circuit has a first end connected to a first end of the transmitter coil and has a second end connected to a second end of the transmitter coil.

7. The non-contact power feeding device according to claim 5, wherein the at least one LC series circuit has a first end connected to a first end of the transmitter coil and has a second end connected to a second end of the transmitter coil.

8. The non-contact power feeding device according to claim 4, wherein the at least one LC series circuit comprises a first LC series circuit having first end connected to a first end of the transmitter coil and having a second end grounded, and a second LC series circuit having a first end connected to a second end of the transmitter coil and having a second end grounded.

9. The non-contact power feeding device according to claim 5, wherein the at least one LC series circuit comprises a first LC series circuit having first end connected to a first end of the transmitter coil and having a second end grounded, and a second LC series circuit having a first end connected to a second end of the transmitter coil and having a second end grounded.

10. A non-contact power feeding device comprising:
a power transmitter device; and
a power receiver device to which the power transmitter device transmits power in a non-contact manner, wherein
the power transmitter device comprises
a transmitter coil configured to supply power to the power receiver device,
a power supply circuit comprising a plurality of switching elements connected between a DC power supply and the transmitter coil in a full-bridge configuration or a half-bridge configuration, the power supply circuit being configured to switch the plurality of switching elements to an on or off state at a switching frequency to convert DC power supplied from the DC power supply into AC power having the switching frequency and supply the AC power to the transmitter coil, and
a phase control circuit comprising at least one LC series circuit connected to both ends of the transmitter coil, wherein a resonance frequency of each of the at least one LC series circuit is higher than the switching frequency and less than twice the switching frequency, and wherein
each of the at least one LC series circuit of the phase control circuit comprises a switching element configured to connect the LC series circuit to the transmitter coil in response to being switched to the on state and to separate the LC series circuit from the transmitter coil in response to being switched to the off state, and
the power transmitter device further comprises
a control circuit configured to control the switching frequency at which the plurality of switching elements of the power supply circuit are switched to the on or off state and to switch the switching element of each of the at least one LC series circuit to the on or off state in accordance with the switching frequency of the AC power supplied from the power supply circuit to the transmitter coil or a voltage of the AC power while the non-contact power feeding device is in constant voltage output action.

11. The non-contact power feeding device according to claim 10, wherein
the power receiver device comprises
a resonance circuit comprising a receiver coil configured to receive power via the transmitter coil of the power transmitter device, and a resonance capacitor configured to resonate with the receiver coil,
a rectifying circuit configured to rectify power output from the resonance circuit,
a voltage detection circuit configured to measure an output voltage of power output from the rectifying circuit to obtain a measured value of the output voltage,
a determination circuit configured to determine whether the non-contact power feeding device is in the constant voltage output action based on the measured value of the output voltage, and
a first transceiver configured to transmit, to the power transmitter device, a signal containing determination information representing whether the non-contact power feeding device is in the constant voltage output action,
the power transmitter device further comprises a second transceiver configured to receive the signal containing the determination information, and
the control circuit controls, when the determination information represents that the non-contact power feeding device is not in the constant voltage output action, the switching frequency to prevent the measured value of the output voltage from changing even when resistance of a load circuit connected to the rectifying circuit of the power receiver device changes.

12. The non-contact power feeding device according to claim 10, wherein the at least one LC series circuit has a first end connected to a first end of the transmitter coil and has a second end connected to a second end of the transmitter coil.

13. The non-contact power feeding device according to claim 11, wherein the at least one LC series circuit has a first end connected to a first end of the transmitter coil and has a second end connected to a second end of the transmitter coil.

14. The non-contact power feeding device according to claim 10, wherein the at least one LC series circuit comprises a first LC series circuit having first end connected to a first end of the transmitter coil and having a second end grounded, and a second LC series circuit having a first end connected to a second end of the transmitter coil and having a second end grounded.

15. The non-contact power feeding device according to claim 11, wherein the at least one LC series circuit comprises a first LC series circuit having first end connected to a first end of the transmitter coil and having a second end grounded, and a second LC series circuit having a first end connected to a second end of the transmitter coil and having a second end grounded.

16. A non-contact power feeding device comprising:
a power transmitter device; and
a power receiver device to which the power transmitter device transmits power in a non-contact manner, wherein
the power transmitter device comprises a transmitter coil configured to supply power to the power receiver device, a power supply circuit comprising a plurality of switching elements connected between a DC power supply and the transmitter coil in a full-bridge configuration or a half-bridge configuration, the power supply circuit being configured to switch the plurality of switching elements to an on or off state at a switching frequency to convert DC power supplied from the DC power supply into AC power having the switching frequency and supply the AC power to the transmitter coil, and a phase control circuit comprising at least one LC series circuit connected to both ends of the transmitter coil, wherein a resonance frequency of each of the at least one LC series circuit is higher than the switching frequency and less than twice the switching frequency, and wherein the at least one LC series circuit comprises a first LC series circuit having a first end connected to a first end of the transmitter coil and having a second end grounded, and a second LC series circuit having a first end connected to a second end of the transmitter coil and having a second end grounded, and the first and second ends of the transmitter coil are not grounded.

* * * * *